UNITED STATES PATENT OFFICE.

PHILIP HELBIG AND HERMANN BERTLING, OF BALTIMORE, MARYLAND.

PROCESS OF MANUFACTURING ANTI-CORROSIVE COMPOUNDS.

SPECIFICATION forming part of Letters Patent No. 439,150, dated October 28, 1890.

Application filed February 3, 1890. Serial No. 339,066. (Specimens.)

*To all whom it may concern:*

Be it known that we, PHILIP HELBIG and HERMANN BERTLING, citizens of the United States, residing at Baltimore, in the State of Maryland, have invented certain new and useful Improvements in the Process of Manufacturing Anti-Corrosive Compounds; and we do declare the following to be a full, clear, and exact description of the invention, such as will enable others skilled in the art to which it appertains to make and use the same.

I have for my invention the manufacture of an anti-corrosive liquid compound which may be readily applied by a brush or sponge to the surface of any metallic body or substance, and thereby render this surface proof against the corrosive action of acids and other like deteriorating agencies, the compound being of equal benefit in the preservation of wood from the deteriorating influences of soil or water.

The particular process of manufacturing the compound, which consists in the employment of cotton-seed oil and pure lead, is such that the cotton-seed oil is caused to absorb and combine therewith such quantity of the lead that an oil of a mineral nature is produced, which in itself will be non-corrosive and of such adhesiveness as to adhere perfectly to the surfaces covered therewith and which will become sufficiently hardened thereon to resist any ordinary abrasion, and thus protect these surfaces from any exterior corrosive influences.

The particular manner of preparing and using the compound is as follows: In practice, where large quantities of the compound are to be manufactured, the relative parts thereof are in due proportion. For an easier comprehension of the operation and the proportion of parts employed in the preparation of the compound there are employed in the following description the smallest quantities that can be handled with advantage. In a suitable metallic vessel of something more than one gallon in capacity is placed one gallon of pure cotton-seed oil. There are now melted in a furnace in a suitable crucible or ladle twenty (20) pounds of pure lead metal, care being taken that the entire quantity of the lead is in the molten state, which will insure a temperature thereof of not less than 334° of heat centigrade. In this molten state the lead is then poured gradually in the one gallon of cotton-seed oil, care being taken that the mixture is well stirred during the process of pouring in order that, as far as possible, each molecule of the molten lead will be exposed to the action of the cotton-seed oil. In this process of pouring the molten lead as soon as the hot and molten metal strikes the surface of the oil it follows the law common to all molten metal when thrown in a liquid and separates into very minute globules, the bright and pure surfaces of which are brought in immediate contact with the cotton-seed oil and by the heat therefrom impart such affinity to the cotton-seed oil in immediate contact therewith that a certain part of the lead will be absorbed by the cotton-seed oil, which, when removed from the influence of the heated globule of lead, will immediately cool sufficient to retain therein the lead thus absorbed. When the entire twenty pounds of molten lead have been thus poured in the gallon of cotton-seed oil, it is allowed to remain some little time to cool off, after which the oil is drawn off, and there will be found remaining in the bottom of the vessel in various forms about seventeen pounds of the pure lead, thus showing that in this one process of pouring about three pounds of lead have been absorbed by the one gallon of cotton-seed oil. The remaining seventeen pounds of lead is now removed from the vessel, and the gallon of cotton-seed oil, that has now about three pounds of lead therein, is returned to the vessel. The remaining seventeen pounds of pure lead is again heated and brought to the molten state, in which condition it is again poured in the cotton-seed oil contained in the vessel, the same care being observed in stirring the mixture during the process of pouring as in the first pouring of the metal. After this second process of pouring the molten lead in the cotton-seed oil the mixture is allowed to cool sufficiently, when the oil is again drawn from the vessel, and there will now be found remaining about fifteen pounds of pure lead, thus showing that in this second process of pouring the molten metal two pounds of lead additional have been absorbed by the cotton-seed oil, which will now contain about five pounds of lead combined therewith. This process of remelting the remaining lead and again pouring and mixing it with the same cotton-seed oil is continued with advantage up to the fifth time of pouring the molten metal, after which the cotton-seed oil will be found to have absorbed about ten pounds of the lead, after which there seems to be no further affinity of the oil for the metal. After the cotton-seed oil has been brought to this stage it is allowed to thoroughly cool, when its consistency will be about that of ordinary paint. The compound is now in condition to be applied to those surfaces that it is desired to protect against corrosive or deteriorating influences and may be applied with a sponge or brush, as in the application of ordinary paint. In applying the compound its adhesiveness will cause it to adhere tightly to the surface coated therewith. It is preferred to apply one coat and then allow it to remain about forty-eight hours, during which time it will have become sufficiently hard to resist any ordinary abrasion, and after which a second coat may be applied with advantage.

It has been found in practice that no other of the known oils, other than cotton-seed oil, possesses the quality of absorbing the lead when treated as herein described, and that the cotton-seed oil possesses the quality of absorbing certain proportions of other metals when poured therein in the molten state in the manner herein described.

It is not strictly necessary that the exact proportions of cotton-seed oil and lead herein stated shall be employed, as these quantities will admit of some variation, though practice has proven that the proportions herein specified give the best results.

As stated, the compound may be employed to protect metallic surfaces of any kind, and it is particularly useful for coating the bottoms of iron or steel ships to protect the surface thereof from rust and the adherence thereto of barnacles and other marine life. It is likewise of equal benefit for the protection of wooden surfaces that are to be buried in the earth or exposed to the action of water—such as fence-posts, piles &c.

Having described my invention, the manner of preparing and using, what I claim, and desire to secure by United States Letters Patent, is—

In the manufacture of an anti-corrosive compound, the process of melting pure metallic lead and then mixing the said lead in its molten state with any quantity of cotton-seed oil, whereby the action of heat therefrom will cause the said cotton-seed oil to absorb some part of the said lead, the process of remelting and again pouring the said lead in the said cotton-seed oil being repeated a sufficient number of times until the said cotton-seed oil has absorbed the desired quantity of the said lead, for the purpose set forth.

In testimony whereof we affix our signatures in presence of two witnesses.

PHILIP HELBIG.
HERMANN BERTLING.

Witnesses:
WM. L. BAILIE,
JNO. T. MADDOX.